United States Patent
Doyle et al.

(10) Patent No.: US 9,701,555 B2
(45) Date of Patent: Jul. 11, 2017

(54) FILTRATION MEDIUM COMPRISING A METAL-CONTAINING PARTICULATE

(71) Applicant: 3M INNOVATIVE PROPERTIES COMPANY, St. Paul, MN (US)

(72) Inventors: Meredith McMurdo Doyle, St. Paul, MN (US); Mark R. Stouffer, Middletown, CT (US); Thomas E. Wood, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 561 days.

(21) Appl. No.: 14/356,903

(22) PCT Filed: Dec. 13, 2012

(86) PCT No.: PCT/US2012/069403
§ 371 (c)(1),
(2) Date: May 8, 2014

(87) PCT Pub. No.: WO2013/096074
PCT Pub. Date: Jun. 27, 2013

(65) Prior Publication Data
US 2014/0305882 A1  Oct. 16, 2014

Related U.S. Application Data

(60) Provisional application No. 61/578,957, filed on Dec. 22, 2011.

(51) Int. Cl.
| | | |
|---|---|---|
| C02F 1/28 | (2006.01) | |
| C02F 1/70 | (2006.01) | |
| B01D 24/00 | (2006.01) | |
| B01J 31/06 | (2006.01) | |
| C02F 101/16 | (2006.01) | |
| C02F 101/36 | (2006.01) | |
| C02F 101/38 | (2006.01) | |

(52) U.S. Cl.
CPC .............. *C02F 1/705* (2013.01); *B01D 24/00* (2013.01); *B01J 31/06* (2013.01); *C02F 1/283* (2013.01); *C02F 1/288* (2013.01); *C02F 1/70* (2013.01); *C02F 2101/16* (2013.01); *C02F 2101/36* (2013.01); *C02F 2101/38* (2013.01); *C02F 2303/185* (2013.01)

(58) Field of Classification Search
CPC .......... C02F 1/283; C02F 1/288; C02F 1/505; C02F 1/68; C02F 1/70; C02F 1/705; C02F 2101/16; C02F 2101/36; C02F 2101/38; C02F 2303/185; B01J 31/06; B01D 24/00
See application file for complete search history.

(56) References Cited

U.S. PATENT DOCUMENTS

| | | | |
|---|---|---|---|
| 4,666,610 A | 5/1987 | Kuhns | |
| 5,338,458 A | 8/1994 | Carrubba | |
| 5,356,849 A | 10/1994 | Matviya | |
| 5,504,050 A | 4/1996 | Hayden | |
| 6,120,698 A | 9/2000 | Rounds | |
| 6,419,837 B1 | 7/2002 | Akse | |
| 6,451,209 B1 | 9/2002 | Kaas | |
| 6,699,393 B2 | 3/2004 | Baker | |
| 6,706,194 B2 | 3/2004 | Baker | |
| 7,097,773 B1 | 8/2006 | Furlough | |
| 7,361,280 B2 | 4/2008 | Baker | |
| 7,727,931 B2 | 6/2010 | Brey | |
| 2002/0112609 A1 | 8/2002 | Wong | |
| 2005/0023211 A1 | 2/2005 | Koslow | |
| 2005/0127323 A1 | 6/2005 | Tyler | |
| 2005/0167367 A1 | 8/2005 | Baker | |
| 2008/0011656 A1 | 1/2008 | Lacy et al. | |
| 2009/0039028 A1 | 2/2009 | Eaton | |
| 2009/0107919 A1* | 4/2009 | Burba, III | C02F 1/281 210/691 |
| 2010/0125039 A1* | 5/2010 | Banerjee | C01B 31/083 502/417 |
| 2011/0296991 A1 | 12/2011 | Hughes | |

FOREIGN PATENT DOCUMENTS

| | | |
|---|---|---|
| CN | 101909714 | 12/2010 |
| CN | 102224103 | 10/2011 |
| JP | 63-000496 | 1/1988 |
| JP | 2003-266082 | 9/2003 |
| WO | WO 97/47380 | 12/1997 |
| WO | WO 2005/123600 | 12/2005 |
| WO | WO 2009/058673 | 5/2009 |
| WO | WO 2009/140033 | 11/2009 |

(Continued)

OTHER PUBLICATIONS

Asano, Y., "Formation and Properties of Plasma-Polymerized Carbon Disulfide Films", *Japn. J. Appl. Phys.*, vol. 22, p. 1618-1622 (1983).

Blayden, H. E. et al., "Solid Complexes of Carbon and Sulphur-I. Sulphurised Polymer Carbons", *Carbon*, vol. 5, p. 533-544 (1967).

Bock, H., et al., "Gas-Phase Reactions", *J. Am. Chem. Soc.*, vol. 108, p. 7844-7846 (1986).

Cal, M. P., et al., "High temperature hydrogen sulphide adsorption on activated carbon II. Effects of gas temperature, gas pressure and sorbent regeneration", *Carbon*, vol. 38, p. 1767-1774 (2002).

Chang, C. H., "Preparation and Characterization of Carbon-Sulfur Surface Compounds", *Carbon*, vol. 19, p. 175-186 (1981).

Chou, J.-H., et al., "Solvatothermal Routes to Poly(carbon monosulfide)s Using Kinetically Stabilized Precursors", *J. Am. Chem. Soc.*, p 4537-4538 (1997).

(Continued)

*Primary Examiner* — Lucas Stelling

(74) *Attorney, Agent, or Firm* — Julie Lapos-Kuchar

(57) ABSTRACT

Described herein is a liquid filtration device is disclosed comprising a fluid conduit fluidly connecting a fluid inlet to a fluid outlet; and a water filtration medium disposed in the fluid conduit; the water filter medium comprising a metal-containing particulate, wherein the metal-containing particulate comprises a thermolysis product of a metal carboxylate; and methods of removing chloramines from aqueous solutions.

10 Claims, No Drawings

(56) References Cited

FOREIGN PATENT DOCUMENTS

| WO | WO 2010/059607 | 5/2010 |
|---|---|---|
| WO | WO 2011/125504 | 10/2011 |
| WO | WO 2013/039675 | 3/2013 |
| WO | WO 2013/096079 | 6/2013 |

OTHER PUBLICATIONS

Crabtree, R.H., "Resolving Heterogeneity Problems and Impurity Artifacts in Operationally Homogenous Transition Metal Catalysts", *Chem. Rev.*, vol. 122, p. 1536-1554 (2012).

Doxsee, D. Et al., "New Carbon Sulfides Based on 4,5-Dimercapto-1,2-dithiole-3thione ($\beta$-$C_3S_5^{2-}$): [$C_3S_5$] $C_6S_8$, and $C_5S_7$", *Inorg. Chem.* vol. 32, p. 5467-5471 (1993).

Figueiredo, J. J., et al., "Modificationof the surface chemistry of activated carbons", *Carbon*, vol. 37, p. 1379-1389 (1999).

Flammang, R., et al., "Formation of thiophenethiols by flash vacuum pyrolysis of 1,6,6a$\lambda^4$-trithiapentalenes", *J. Chem. Soc. Perkin Trans.* 2, p. 1261-1264 (1997).

Fu, Jun et al. "Mechanism of Cu(II)-catalyzed monochloramine decomposition in aqueous solution", *Science of the Total Environment*, vol. 407, p. 4105-4109 (2009).

Galloway, C.P. et al., "Binary Carbon and Sulfides Based on the $\alpha$-$C_3S_5$ Subunit and Related C-S-O, C-S-Cl, C-S-N Compounds", *Inorg. Chem.*, vol. 33, p. 4537-4544 (1994).

Hsi, H. C., et al., "Effects of Sulfur Impregnation Temperature on the Properties and Mercury Adsorption Capacities of Activated Carbon Fibers (ACFs)", *Environ. Sci. Tech.*, vol. 35, p. 2785-2791 (2001).

Jacangelo, J. G., et al., "Oxidation of Sulfhydryl Groups by Monochloramine", *Water Res.*, vol. 21, p. 1339-1344 (1987).

Komorita, J. D., et al., "Technical Note: Monochloramine Removal From Water by Activated Carbon", *J. Am. Water Works Assoc.*, vol. 77, No. 1, p. 62-64 (1985).

Krishnan, K. A., et al., "Uptake of Heavy Metals in Batch Systems by Sulfurized Steam Activated Carbon Prepared from Sugarcane Bagasse Pith", *Ind. Chem. Res.*, vol. 41, p. 5085-5093 (2002).

Krivoshei, I. V. et al., "Conjugated Inorganic Carbon-based Polymers", *Russ. Chem. Rev.*, vol. 50, p. 746-767 (1981).

Kurmaev, E. Z., et al., "Interlayer conduction band states in graphite-sulfur composites", *Phys. Rev. B*, vol. 66, p. 193402-1-193402-3.

Liang, C. et al., "Mesoporous Carbon Materials: Synthesis and Modification", *Angew. Chem. Int. Ed.*, vol. 47, p. 3696-3717 (2008).

Macías-García, A., et al., "Adsorption of cadmium by sulphur dioxide treated activated carbon", *J. Haz. Mat.*, B103, p. 141-152 (2003).

Maier, G., et al., "Thioxoethenylidene $C_2S$: A Matrix-Spectroscopic Study", *Eur. J. Org. Chem.*, p. 4197-4202 (2004).

Müller, H. et al., "Bis-substitued Tetrathiapentalenes—Novel Building Blocks for Extended Tetrathiafulvalenes and Conducting Polymers", *Tet. Lett.*, vol. 38, p. 3215-3218 (1997).

Pedersen, C. T., et al., "3,6-Dihydro[1,2]dithiolo]4,3-c][1,2]dithiole-3,6-dithione and oxo analogues: a comparative study of the thermal (FVP) and electron ionization (EI) induced fragmentations", *J. Chem. Soc. Perkin Trans.* 2, p. 1403-1406 (1998).

Petit, C., et al., "The role of sulphur-containing groups in ammonia retention on activated carbons", *Carbon*, vol. 48, p. 654-667(2010).

Petit, C., et al., "The effect of oxidation on the surface chemistry of sulphur-containing carbons and their arsine adsorption capacity", *Carbon*, vol. 48, p. 1779-1787 (2010).

Plank, N. O. V., et al., "Thiolation of single-wall carbon nanotubes and their self-assembly", *Appl. Phys, Lett.*, vol. 85, p. 3229-3231 (2004).

Puri, R. R., et al., "Carbon-Sulphur Surface Complexes on Charcoal", *Carbon*, vol. 9, p. 123-134 (1974).

Schumaker, R., et al., "Thiapen Chemistry. 2. Synthesis of 1,3,4,6-Tetrathiapentalene-2,5-dione", *J. Am. Chem. Soc.*, vol. 99, p. 5521-5522 (1977).

Sülzle, D. et al., "Experimental Evidence for the Existence of Polycarbon Oxide Sulfides $O(C_n)S$ (n = 3-5) in the Gas Phase", *J. Am. Chem. Soc.*, vol. 113, p. 48-51 (1991).

Vikesland, P. J. et al., "Reaction Pathways Involved in the Reduction of Monochloramine by Ferrous Ion." *Environ. Sci. Technol.*, vol. 34, p. 83-90 (2000).

Wang, J., et al., "Adsorption of Hg(II) by Sulfur-Impregnated Activated Aqueous Carbon", *Environ. Eng. Sci.*, vol. 26, p. 1693-1699 (2009).

Wepasnick, K. A., et al., "Surface and structural characterization on multi-walled carbon nanotubes following different oxidative treatments", *Carbon*, vol. 49, p. 24-36 (2011).

Yamada, J., et al., "Synthesis of new TTF(s)-fused donors and electrical conductivities of their radical cation salts", *Syn. Met.*, vol. 86, p. 1823-1824 (1997).

PCT Search Report, PCT/US2012/069403 2013.

\* cited by examiner

FILTRATION MEDIUM COMPRISING A METAL-CONTAINING PARTICULATE

CROSS REFERENCE TO RELATED APPLICATIONS

This application is a national stage filing under 35 U.S.C. 371 of PCT/US2012/069403, filed Dec. 13, 2012, which claims priority to U.S. Provisional Patent Application No. 61/578,957 filed Dec. 22, 2011, the disclosures of which are incorporated by reference in their entirety herein.

TECHNICAL FIELD

A filtration medium comprising a metal-containing particulate is described, wherein the metal-containing particulate comprises a thermolysis product of a metal carboxylate.

BACKGROUND

Chloramine is commonly used in low concentration as a secondary disinfectant in municipal water distribution systems as an alternative to chlorination with free chlorine. Concerns over taste and odor of chloramine treated water have led to an increase in the demand for water filters with chloramine removal capabilities.

Carbon particles, such as activated carbon particles, have been used to remove chloramine from aqueous streams. Improvements in removal of chloramine can be achieved by reducing the mean particle diameter of the carbon and by increasing the carbon bed contact time. Although parameters such as contact time and mean particle diameter are known to affect chloramine removal efficiencies, more significant improvements are desired without significantly increasing the pressure drop of filtration media.

U.S. Pat. No. 5,338,458 (Carrubba et al.) discloses an improved process for the removal of chloramine from gas or liquid media by contacting the media with a catalytically-active carbonaceous char.

U.S. Pat. No. 6,699,393 (Baker et al.) shows improved chloramine removal from fluid streams, when the fluid stream is contacted with an activated carbon, which has been pyrolyzed in the presence of nitrogen-containing molecules, versus a catalytically-active carbonaceous char.

SUMMARY

There is a desire to provide a filtration medium, which is less expensive and/or more efficient at the removal of chloramine than currently available filtration media. In some instances, there is also a desire to provide a solid block of carbon to remove chloramine. In other instances, there is a desire to have a granular material that may be used in a packed bed. In still other instances, there is a desire to provide a material that may be used in a web-form.

In one aspect, a liquid filtration device is disclosed comprising a fluid conduit fluidly connecting a fluid inlet to a fluid outlet; and a liquid filtration medium disposed in the fluid conduit; the liquid filter medium comprising a metal-containing particulate, wherein the metal-containing particulate comprises a thermolysis product of a metal carboxylate.

In another aspect, a method for removing chloramine from aqueous solutions is disclosed comprising: providing an aqueous solution comprising chloramine and contacting the aqueous solution with a composition comprising a metal-containing particulate, wherein the metal-containing particulate comprises a thermolysis product of a metal carboxylate.

In yet another aspect, a method from removing chloramine from aqueous solutions is disclosed comprising: heating a metal carboxylate to form a thermolysis product; cooling the thermolysis product; and contacting the cooled thermolysis product with an aqueous solution comprising chloramine The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more; and
"and/or" is used to indicate one or both stated cases may occur, for example A and/or B includes, (A and B) and (A or B).
Also herein, recitation of ranges by endpoints includes all numbers subsumed within that range (e.g., 1 to 10 includes 1.4, 1.9, 2.33, 5.75, 9.98, etc.).
Also herein, recitation of "at least one" includes all numbers of one and greater (e.g., at least 2, at least 4, at least 6, at least 8, at least 10, at least 25, at least 50, at least 100, etc.).

The present disclosure is directed to a composition comprising a thermolysis product of a metal carboxylate. It has been found that such compositions may be useful for the removal of chloramine from aqueous solutions.

Thermolysis Product of Metal Carboxylates

The metal carboxylates of the present disclosure include metal salts or metal complexes of a carboxylic acid. Exemplary carboxylates include: oxalates, formates, propionates, acetates, tartrates, benzoates, lactates, and citrates, and combinations thereof.

The metal portion of the metal carboxylate may include any metal, however, metals that are acceptable for presence in drinking water are preferred. Exemplary metals include: copper, iron, silver, and manganese, and combinations thereof.

Exemplary metal carboxylates of the present disclosure include: cupric oxalate, ferrous oxalate, cupric acetate, ferric citrate, and copper formate, and combinations thereof.

The present disclosure is directed toward the thermolysis product of a metal carboxylate. Thermolysis involves heating the metal carboxylate at or above the temperature at which the metal carboxylate begins to lose metal-bound water, if present, and at which the carboxylate portion of the compound begins to decompose. As used herein a "thermolysis product" refers to a product that results from the dissociation or decomposition of a compound by heat. This thermolysis process is believed to change the nature of the metal carboxylate to a material having a different stoichiometry, composition, and/or different chemical properties, wherein at least a portion of the carboxylate is thermally decomposed and is removed by volatilization as a gas.

In one embodiment, upon thermolysis, the oxidation state of the metal changes. For example, in one embodiment of the present disclosure, the metal in the thermoylsis product comprises at least a portion of the metal with an oxidation state of, for example, $Cu^0$, $Cu^{+1}$, or $Fe^{+2}$.

Although not wanting to be bound by theory, in another embodiment, the thermolysis of the metal carboxylate is thought to produce a material having active surface sites that exhibit enhanced activity for catalyzing the decomposition of chloramines. The production of these surface sites by thermolysis of the metal carboxylate results in materials with chloramine removal properties superior to those that result from utilizing similar metal compounds (such as are observed by X-ray diffraction analysis of the thermolysis product) produced by non-thermolysis methods, e.g., metal oxides derived from more traditional methods or finely divided metals. In the present disclosure, the metal-containing particulate comprises the thermolysis product of the metal carboxylate.

In one embodiment, the metal carboxylate is thermally treated to form the thermolysis product.

In another embodiment, the metal carboxylate is thermally treated in the presence of a support, for example, carbon substrates or inorganic oxide substrates. The metal carboxylate may be impregnated into the support prior to thermolysis. For example, a metal carboxylate may be dissolved in a solvent and the resulting solution contacted with the support. The impregnated support then may be heated to form a thermolysis product disposed on the surface of a support.

In another embodiment, metal carboxylates, which are not sufficiently soluble to dissolve in the solvent (i.e., do not completely dissolve in the volume of solvent used in the experiment) may be impregnated into the support by adding the metal carboxylate and the support to a solvent. In time, the metal carboxylate that is dissolved in the solvent can diffuse into the support and deposit thereon, so that the metal carboxylate is incorporated into or onto the support over time.

As used herein "metal-containing particulate" includes both the thermolysis product of the metal salt and the thermolysis product of the metal salt in the presence of a carbon substrate or inorganic oxide substrate, such substrates can include granular materials, powder materials, fibers, tubes, and foams.

In one embodiment, it is preferable for the metal-containing particulate product to be porous. The porous nature will enable, for example, more surface area for chloramine removal. Preferably having a high surface area (e.g., at least 100, 500, 600 or even 700 $m^2/g$; and at most 1000, 1200, 1400, 1500, or even 1800 $m^2/g$ based on BET (Brunauer Emmet Teller method) nitrogen adsorption). Such high surface areas may be accomplished by using a highly porous carbon substrate or inorganic oxide substrate and/or by applying a physical technique applied (such as crushing or pulverizing) to decrease the particle size of the resulting product.

Carbon Substrates and Inorganic Oxide Substrates

The morphology of the carbon substrate is not particularly limited and may include a non-particulate, a particulate, or an aggregate. Additional exemplary morphologies include: a carbon block, a carbon monolith, foams, films, fibers, and nanoparticulates such as nanotubes and nanospheres. A non-particulate is a substrate that is not composed of discernable, distinct particles. A particulate substrate is a substrate materials, powder materials, fibers, tubes, and foams.

In one embodiment, it is preferable for the metal-containing particulate product to be porous. The porous nature will enable, for example, more surface area for chloramine removal. In one embodiment, the particulate has a high surface area. A particulate substrate is a substrate that has discernable particles, wherein the particle may be spherical or irregular in shape and has an average diameter of at least 0.1, 1, 5, 10, 20, or even 40 micrometers (μm) to at most 75 μm, 100 μm, 500 μm, 1 millimeter (mm), 2 mm, 4mm, 6.5 mm, or even 7 mm. An aggregate (or a composite) is formed by the joining or conglomeration of smaller particles with one another or with larger carrier particles or surfaces. The aggregates may be free standing (self-supporting against gravity).

Typically, the morphology the carbon substrate will be selected based on the application. For example, particulate with a large particle size is desirable when the compositions of the present disclosure are used in applications requiring low pressure drops such as in beds through which gases or liquids are passed. In another example, particle sizes of 40 to 200 μm, may be preferable when used in a carbon block monolith.

Commercially available carbon substrates include: granular activated carbon available under the trade designation "RGC" by Mead Westvaco Corp, Richmond, Va. may be preferred in water treatment. Activated coconut carbon available under the trade designation "KURARAY PGW" by Kuraray Chemical Co., LTD, Okayama, Japan may also be used.

The size of the pores of the carbon substrate can be selected based on the application. The carbon substrate may be microporous carbon, macroporous carbon, mesoporous carbon, or a mixture thereof.

The carbon substrates can contain larger regions of crystalline, graphitic domains or they can be substantially disordered. Particularly useful are carbon substrates that are substantially disordered and have high surface areas. As used herein, substantially disordered means that the carbon substrate has in-plane domain sizes of about 1-10 nm.

In one embodiment, the carbon substrate is comprised of activated carbon, in other words carbon that has been processed to make it highly porous (i.e., having a large number of pores per unit volume), which thus, imparts a high surface area.

The morphology of the inorganic oxide substrate is not particularly limited and may include a non-particulate, a particulate, or an aggregate. Exemplary morphologies include: fibers, and nanoparticulates.

The inorganic oxide substrate may comprise, for example, silicon dioxide (silica), zirconia, titania, ceria, alumina, iron oxide, zinc oxide, tin oxide, alumina/silica, zirconia-silica, clays, talc-containing materials, spinel-structured oxides such as magnesium aluminate or cobalt iron oxide or the like, and other binary or ternary oxides of aluminum or silicon with other metal oxide materials. Although the inorganic oxide may be essentially pure, it may contain small amounts of stabilizing ion such as ammonium and alkaline metal ions, or it may be a combination of oxides such as a combination of titania and zirconia.

The size of the pores of the inorganic oxide substrate can be selected based on the application. The inorganic oxide substrate may be microporous, macroporous, mesoporous, or a mixture thereof. Particularly useful are inorganic oxide substrates that have high surface areas.

The choice of support materials is quite broad and can include without limitation alumina, silica, zeolites, ion exchange resins and porous organic materials, activated carbon, metal oxides and metal oxide framework (MOF) materials, and inorganic oxides. All of these materials can be used in combination with one another or in combination with a carbon substrate.

Preparation of the Thermolysis Product

As previously mentioned, the metal carboxylate is thermally treated alone or in the presence of a support to form the thermolysis product.

The thermal treatment may be conducted in an air environment or in an inert environment, such as in a nitrogen or argon environment.

The thermolysis temperature, the temperature at which the thermolysis reaction is conducted, may be conducted at a temperature of at least 200, 250, 300, 400, or even 500° C.; and at most 650, 700, 800, 900, or even 1000° C. Generally the temperature at which thermolysis is conducted may be determined, by first analyzing the material (e.g., the metal carboxylate or the metal carboxylate impregnated support) to be treated by differential thermal analysis/thermal gravimetric analysis (DTA/TGA) performed under controlled conditions (e.g., atmosphere and heating rate) to determine its thermal decomposition behavior.

Then trials may be performed by thermolyzing the material at various temperatures beginning with the onset temperature of decomposition to determine at what point and under what conditions (e.g., temperature, time and atmosphere) the most active material (e.g., active for chloramines removal) is formed.

As will be shown in the examples, in one embodiment, as the reaction temperature changes the thermolysis product of the metal carboxylate changes and there may be a select temperature based on the metal carboxylate and support used, if any, which offers a more efficient removal of chloramine For example, excessive heating of the metal carboxylate can result in "over-firing" of the reaction product, and the activity of the material can diminish. In one embodiment, the presence of a carbon support during the thermolysis treatment can alter the decomposition temperature.

Although the thermolysis product should only comprise elements present in the metal carboxylate, small amounts of other elements may be present, due to impurities present in the metal carboyxlate, the support used, and/or in the atmosphere used during the thermal treatment. In one embodiment, the metal-containing particulate is substantially free of sulfur atoms (i.e., less than 5%, 2%, 1%, 0.1%, 0.05%, or even 0.01% of sulfur atoms based on the weight of the metal-containing particulate).

Use

In one embodiment of the present disclosure, the metal-containing particulate is used as a filter medium. Because of the ability of the compositions of the present disclosure to remove chloramine, the compositions of the present disclosure may be used as a filtration media. Filtration methods as known in the art can be used.

Although the metal-containing particulate may be used in an uncontained (bulk-fashion), it is preferable that the metal-containing particulate be contained in some sort of support matrix and/or vessel for ease of use.

In one embodiment, more than one kind of metal-containing particulate may be used.

The metal-containing particulate of the present disclosure may be used in a powdered form, a granular form, or shaped into a desired form. For example, the metal-containing particulate may be a compressed blend of a carbon substrate, the thermolysis product of the metal carboxylate, and a binder material, such as a polyethylene, e.g., an ultra high molecular weight polyethylene, or a high-density polyethylene (HDPE). In another embodiment, the metal-containing particulate of the present disclosure may be loaded into web, such as a blown microfiber, which may or may not be compacted such as described in U.S. Publ. No. 2009/0039028 (Eaton et al.), herein incorporated in its entirety.

Because the metal-containing particulate may comprise a ferromagnetic material, in one embodiment, the metal-containing particulate may be part of a carbon support such as carbon particles, which can be heated by induction heating to form composite blocks. Typically in making a carbon block monolith, carbon particles are heated in an oven to fuse the carbon particles together. When using ferromagnetic material, a high frequency magnetic field may be used to heat the metal-containing particulate, causing the carbon support to become fused and form a carbon block monolith. In one embodiment, the magnetic field may oscillate at a frequency in a range from about $10^3$ Hz to about $10^{15}$ Hz.

The use of induction heating to prepare a composite block, may allow more uniform heating and better heat penetration to the core of the composite carbon block and/or increase manufacturing throughput of the carbon block composites. The levels of iron salts versus other metal salts may be varied to optimized the ferromagnetic properties and the chloramine removal properties of the material.

In one embodiment, the metal-containing particulate is disposed in a fluid conduit, wherein the fluid conduit is fluidly connected to a fluid inlet and a fluid outlet. Such systems may include packed beds.

In one embodiment, the metal-containing particulate may be used to remove chloramines from a fluid stream, particularly a liquid fluid stream, more specifically, an aqueous fluid stream. Chloramines are formed from the aqueous reaction between ammonia and chlorine (hypochlorite). Thus, adding ammonia ($NH_3$) to a chlorination system converts chlorine to chloramines. Specifically, monochloramine, hereafter referred to as "chloramine," in low concentrations arise from the disinfection of potable water sources. In one embodiment, after contacting the aqueous solution with a composition comprising a metal-containing particulate, as disclosed herein, the resulting aqueous solution comprises a reduced amount of chloramines, for example, at least a 10, 20, 25, 30, or even 50% chloramine reduction as measured by the Chloramine Removal Test, at 180 seconds described in the Example Section below.

Previous publications, such as Vikesland, et al. in Environmental Science and Technologies, 200, 34, 83-90 have suggested that the water soluble forms of the ferrous ion are responsible for the removal of chloramines Surprisingly, in one embodiment of the present disclosure, it has been discovered that the metal in the metal-containing particulate has limited solubility in water (in other words, a solubility producing metal ion concentrations of less than 2 ppm, 1 ppm, 0.5 ppm, or even 0.1 ppm). When the metal-containing particulate is washed with water, little to no metal is present in the wash water and the washed metal-containing particulate retains its activity for chloramine removal. In one embodiment, when the thermolysis product of a metal carboxylate is washed, it does not lose more than 5, 10, 15, 20, 30, 40, 50, or even 60% of its original activity for the removal of chloramines. Having an insoluble or limited solubility thermolysis product may be advantageous, because the metal can be immobilized, preventing leaching into the treated water, enable the metal-containing particulate to be conditioned prior to use, and/or generate longer lifetimes of the filtration media.

Exemplary embodiments of the present disclosure include:

Item 1. A liquid filtration device comprising a fluid conduit fluidly connecting a fluid inlet to a fluid outlet; and a water filtration medium disposed in the fluid conduit; the water filter medium comprising a metal-containing particulate, wherein the metal-containing particulate comprises a thermolysis product of a metal carboxylate.

Item 2. The water filtration device of item 1, wherein the metal carboxylate comprises an oxalate, an acetate, a citrate, and combinations thereof.

Item 3. The water filtration device of any one of the previous items, wherein the metal of the metal carboxylate comprises copper, iron, manganese, and combinations thereof.

Item 4. The water filtration device of any one of the previous items, wherein the metal-containing particulate is substantially free of sulfur atoms.

Item 5. The water filtration device of any one of the previous items, wherein water filtration medium does not comprise a support.

Item 6. A method for removing chloramine from aqueous solutions comprising: providing an aqueous solution comprising chloramine and contacting the aqueous solution with a composition comprising a metal-containing particulate, wherein the metal-containing particulate comprises a thermolysis product of a metal carboxylate.

Item 7. The method for removing chloramine from aqueous solutions of item 6, wherein the thermolysis product of a metal carboxylate when washed does not lose more than 20% of its activity for the removal of chloramines.

Item 8. The method of item 6, wherein the carboxylate of the metal carboxylate comprises an oxalate, an acetate, a citrate, and combinations thereof.

Item 9. The method of any one of items 6-8, wherein the metal of the metal carboxylate is selected from the group consisting of copper, iron, manganese, and combinations thereof.

Item 10. The method of any one of the previous items, wherein the metal-containing particulate is substantially free of sulfur atoms.

Item 11. The method of any one of the previous items, wherein after contacting the aqueous solution with a composition comprising a metal-containing particulate, the resulting aqueous solution comprises a reduced amount of chloramine.

Item 12. A method for removing chloramine from aqueous solutions comprising:
heating a metal carboxylate to form a thermolysis product;
cooling the thermolysis product; and
contacting the cooled thermolysis product with an aqueous solution comprising chloramine.

Item 13. The method of item 12, wherein the heating is conducted at a temperature of at least 300 C.

Item 14. The method of any one of items 12-13, wherein at least a portion of the metal carboxylate contacts a support during the heating step.

Item 15. The method of any one of items 12-14, wherein the heating is conducted in an inert atmosphere.

Item 16. A carbon block comprising: (a) a carbon support, (b) a metal-containing particulate, wherein the metal-containing particulate comprises a thermolysis product of a metal carboxylate, and (c) a binder.

Item 17. The carbon block of item 16, wherein the binder is selected from polyethylene.

Item 18. A method of making a composite carbon article comprising:
providing a mixture comprising (a) a metal-containing particulate wherein the metal-containing particulate comprises a thermolysis product of a metal salt, wherein the salt is selected from nitrogen-containing oxyanions, sulfur-containing anions, chlorides, phosphates, and combinations thereof; and (b) a melt-processable polymer;
contacting the mixture with a high-frequency magnetic field, wherein the high-frequency magnetic field oscillates in a range from about $10^3$ Hz to about $10^{15}$ Hz.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wisc., or known to those skilled in the art unless otherwise stated or apparent.

These abbreviations are used in the following examples: cc=cubic centimeters, g=gram, hr=hour, in=inch, kg=kilograms, min=minutes, mol=mole; M=molar, cm=centimeter, mm=millimeter, ml=milliliter, L=liter, N=normal, psi=pressure per square inch, MPa=megaPascals, and wt=weight.

Testing Methods

Apparent Density Determination

The apparent density of a sample (prepared according to Comparative Examples or the Examples according to the disclosure) was determined by tapping a weighed sample in a graduated cylinder until closest packing was achieved. The closest packing was deemed to occur when tapping did not produce a further decrease in volume of the carbon substrate sample.

Chloramine Test

The chloramine content of water samples was determined from the total chlorine content in the samples. Total chlorine ($OCl^-$ and chloramines) concentration was measured by the DPD Total Chlorine Method, Hach Method 8167, which Hach Company claims to be equivalent to USEPA Method 330.5. The free chlorine ($OCl-$) concentration was periodically measured by the DPD Free Chloramine Analysis, Hach Method 8021, which Hach company claims is equivalent to EPA Method 330.5. Free chlorine was maintained at a negligible concentration (<0.2 ppm), thus, the total chlorine analysis was considered a good approximation of the concentration of chloramines in the water. All reagents and the instruments were those described in the standard Hach Method and can be obtained from Hach Company, Loveland, Col.

Chloramine Preparation 3 ppm choramine was prepared by adding the appropriate amount of commercial bleach (5.25% NaOCl) to deionized water. While stirring, 1.5 equivalents of a solution of ammonium chloride in water was added to the bleach solution and stirred for 1 hour. The pH was adjusted to 7.6 by the addition of NaOH or HCl and tested using a pH meter (obtained from Thermo Fisher Scientific, Inc., Waltham, Mass., under the trade designation "ORION 3-STAR").

Chloramine Removal Test

An aqueous chloramine test solution was prepared comprising 3 ppm $NH_2Cl$ (prepared as described above) at a pH 7.6 at 27° C. Immediately prior to the test, the initial total chlorine content of the aqueous chloramine test solution was measured as described in the Chloramine Test above. With continuous stirring, a 0.46 g aliquot of a carbon substrate sample (i.e. a sample prepared according to Comparative Examples or the Examples according to the disclosure), or a designated amount of a metal or metal oxide substrate sample was added to the aqueous chloramine test solution. For the commercially available metal or metal oxides shown in Table 1, the samples were compared on a per volume basis, measuring 1.5 cc.

Immediately after mixing, a timer was started. After 30 sec, a 5 mL-aliquot of mixture was removed and within 5 sec of removal, the mixture was passed through a 1-micrometer syringe filter to remove suspended solids. The chloramine content of the filtered aliquot was measured within 30 sec of taking the 5-mL aliquot as described above. Aliquots from the mixture were taken periodically over the course of 5 minutes and analyzed using the Chloramine Test as described above. The efficiency of the chloramine removal is reported as the % chloramine reduction determined by the equation:

$$\left(1 - \frac{[NH2Cl] filtered\, aliquot}{[NH2Cl] initial}\right) \times 100$$

Materials powder appeared shiny/metallic. Table 1 describes the metal oxides and copper metal used and Table 3 reports the percentage of chloramine reduction after 5 minutes.

TABLE 3

| Metal or Metal Oxide | Material Phase | Chloramine Reduction (%) |
|---|---|---|
| 1 | MnO | 0 |
| 2 | $Mn_3O_4$ | 0 |
| 3 | $Mn_2O_3$ | 4 |
| 4 | $MnO_2$ | 0 |
| 5 | $Fe_3O_4$ | 3 |
| 6 | $Fe_2O_3$ | 0 |
| 7 | CoO | 8 |
| 8 | $Co_3O_4$ | 4 |
| 9 | NiO | 7 |
| 10 | $Cu_2O$ | 56 |
| 11 | CuO | 7 |
| 12 | ZnO | 7 |
| 13 | $ZnTiO_4$ | 4 |
| 14 | $CeO_2$ | 10 |
| 15 | Cu | 7 |

TABLE 1

Metal Oxides

| Metal or Metal Oxide | Description |
|---|---|
| 1 | powder of MnO obtained from Sigma-Aldrich Chemical Company |
| 2 | powder of $Mn_3O_4$ obtained from Sigma-Aldrich Chemical Company |
| 3 | powder of $Mn_2O_3$ designated as 325 mesh obtained from Sigma-Aldrich Chemical Company |
| 4 | powder of $MnO_2$ obtained from Fisher Scientific, Inc., Waltham, MA |
| 5 | powder of $Fe_3O_4$ obtained from Fisher Scientific, Inc. |
| 6 | powder of $Fe_2O_3$ obtained from J. T. Baker, a division of Covidien, Phillipsburg, NJ |
| 7 | powder of CoO obtained from K&K Chemicals, Plainview, NY |
| 8 | powder of $Co_3O_4$ obtained from Sigma-Aldrich Chemical Company |
| 9 | powder of NiO obtained from J. T. Baker |
| 10 | powder of $Cu_2O$ obtained from J. T. Baker |
| 11 | powder of CuO designated as less than 5 μm obtained from Sigma-Aldrich Chemical Company |
| 12 | powder of ZnO obtained from Fisher Scientific, Inc. |
| 13 | of $ZnTiO_4$ obtained from Johnson Matthey, Wayne, PN |
| 14 | powder of $CeO_2$ obtained from Alfa Aesar, Ward Hill, MA |
| 15 | powder of Cu metal obtained from Sigma-Aldrich Chemical Company |

TABLE 2

| Name | Description |
|---|---|
| Substrate A | (RGC carbon) was an activated carbon powder with an ash content of 2.9 wt % (obtained from MeadWestvaco Specialty Chemicals, North Charleston, SC) used as received without further treatment. |
| Substrate B | activated carbon powder (obtained from MeadWestvaco Specialty Chemicals, North Charleston, SC, under the trade designation "AQUAGUARD") and was ground to give a particle size similar to RGC carbon as measured by laser diffraction. |
| Substrate C | $Al_2O_3$ beads (obtained from UOP, LLC, Des Plaines, IL) and was crushed into a fine powder with a mortar and pestle prior to use. |
| Substrate D | Hombifine N ($TiO_2$) powder (obtained from Sachtleben Chemie, Duisberg, Germany) used as received without further treatment. |

Comparative Example A

Various commercially available metal oxides and copper metal were tested following the Chloramine Removal Test described above. The metal oxides were used as received. The bottle containing the copper metal had been previously opened (some oxidation may have occurred), however the Procedure for Preparing Cupric Oxalate or Ferrous Oxalate Impregnated Substrates (excluding Example 15)

Cupric oxalate hemihydrate (obtained from GFS Chemicals, Inc., Powell, OH and used as received) or ferrous oxalate hydrate, $FeC_2O_4 \cdot 2H_2O$, (obtained from Sigma-Aldrich Chemical Co. and used as received) was combined with the designated substrate (in a ratio indicated by the percentage based on metal content to the substrate as a weight percentage) as a slurry in water. Heating was applied in some cases to speed up the impregnation process (indicated in Table 4). Due to the slight solubility of cupric oxalate hemihydrate or ferrous oxalate hydrate, disappearance of the blue or yellow colored (respectively) particulates from solution was indicative of the completion of impregnation. For example, in Example 1, 1.26 g of cupric oxalate hemihydrate was combined with 5 g of Substrate A in 100 mL of water and stirred for approximately 2 days at reflux before isolating the carbon impregnated material.

Procedure for Preparing Cupric Acetate Impregnated Substrates

An indicated amount of cupric acetate hydrate $Cu(O_2C_2H_3)_2 \cdot H_2O$ (obtained from J. T. Baker Chemical Co, Phillipsburg, N.J. and used as received) based on the percentage by mass of copper in relation to the indicated support was dissolved in a minimal amount of water to form a solution. To impregnate, the solution was added to the substrate to incipient wetness. Multiple cycles consisting of impregnation followed by drying were used in order to incorporate all of the solution into the support.

Examples 1-4, 7-14, and 17-19

Examples 1-4, 7-14, and 16-18 were prepared according to the procedures outlined above. Impregnation techniques were accomplished at room temperature unless a temperature is indicated in the column where the metal carboxylate impregnate is listed. Then, the impregnated samples were fired in a furnace for 1 hr at the listed temperature, under either a $N_2$ (purged with $N_2$ prior to heating) or an air atmosphere. The samples were allowed to cool to room temperature in the furnace. The samples were then tested for % chloramine reduction using the Chloramine Removal Test without further treatment.

Examples 5-6, 16, and 20-21

Examples 5-6, 16, and 20-21 were commercially available powders that were heat treated for 1 hr at the given temperature under the given atmosphere of either $N_2$ (purged with $N_2$ prior to heating) or in air. The samples were allowed to cool to room temperature in the furnace. The samples were then tested for % chloramine reduction using the Chloramine Removal Test without further treatment.

Example 15

A copper containing solution was prepared by dissolving 88.0 g of copper (II) chloride dihydrate, $CuCl_2 \cdot 2H_2O$ (Alfa Aesar, Ward Hill, Mass.), in 400 g of deionized water. A potassium oxalate containing solution was prepared by dissolving 120.56 g of potassium oxalate hydrate, $K_2C_2O_4H_2O$ (Avantor Performance Materials, Inc., Center Valley, Pa.), in 400 g of deionized water. These solutions were simultaneously added dropwise to a rapidly stirred dispersion of 100.0 g of Hombifine titania (Substrate D) in 200 g of deionized water. An IKA T25 Ultra-turrax rotor-stator mixer (IKA Works Inc., Wilmington, N.C., USA) was used to agitate the dispersion during this addition. After this precipitation, the solid product was separated by centrifugation (3500 revolutions per minute) for 30 minutes. The supernatant was discarded and the product was washed with about 500 ml deionized water and separated again by centrifugation. The resulting product was dried at 95° C. overnight and after cooling the samples were then tested for % chloramine reduction using the Chloramine Removal Test.

Comparative Examples B-E

Comparative Examples B-E were the commercially available substrates that were heat treated for 1 hr at the given temperature under the given atmosphere of either $N_2$ (purged with $N_2$ prior to heating) or in air. The samples were allowed to cool to room temperature in the furnace. The samples were then tested for % chloramine reduction using the Chloramine Removal Test without further treatment.

Table 4 below summarizes the materials (such as substrate and metal impregnant, or simply metal carboxylate without a substrate, as well as their relative compositions) and the process conditions used for preparing samples of each of Comparative Examples B-E and Examples 1-20. Departures from the general conditions are noted. Metal % is defined as target weight percent of the metal with the metal containing substrate, after thermolysis. Chloramine reduction percentages for the prepared samples are also included in Table 4. The % chloramine reduction reported in Table 4 is determined using the Chloramine Reduction Test as described above after 180 seconds.

TABLE 4

| Example | Substrate | Metal Containing Thermolysis Precursor | Furnace Treatment Temperature (° C.) | Chloramine Reduction (%) at 180 sec |
|---|---|---|---|---|
| Comp. B | A | NA | NA | 41 |
| Comp. C | B | NA | NA | 90 |
| Comp. D | C | NA | NA | 0 |
| Comp. E | D | NA | NA | 4* |
| 1 | A | $CuC_2O_4 \cdot 0.5H_2O$ (9% Cu), 100° C. | 300, $N_2$ | 86 |
| 2 | A | $CuC_2O_4 \cdot 0.5H_2O$ (4.5% Cu) | 300, $N_2$ | 82 |
| 3 | A | $CuC_2O_4 \cdot 0.5H_2O$ (9% Cu), 100° C. | 300, air | 38* |
| 4 | C | $CuC_2O_4 \cdot 0.5H_2O$ (9% Cu) | 300, $N_2$ | 87 |
| 5 | none | $CuC_2O_4 \cdot 0.5H_2O$ | 300, $N_2$ | 96* |
| 6 | none | $CuC_2O_4 \cdot 0.5H_2O$ | 300, air | 3* |
| 7 | A | $Cu(O_2C_2H_3)_2 \cdot H_2O$ (9% Cu) | 300, $N_2$ | 82 |
| 8 | A | $Cu(O_2C_2H_3)_2 \cdot H_2O$ (4.5% Cu) | 300, $N_2$ | 64 |
| 9 | A | $Cu(O_2C_2H_3)_2 \cdot H_2O$ (9% Cu) | 400, $N_2$ | 94 |
| 10 | A | $Cu(O_2C_2H_3)_2 \cdot H_2O$ (9% Cu) | 500, $N_2$ | 94 |
| 11 | A | $Cu(O_2C_2H_3)_2 \cdot H_2O$ (9% Cu) | 600, $N_2$ | 86 |
| 12 | A | $Cu(O_2C_2H_3)_2 \cdot H_2O$ (9% Cu) | 300, air | 45* |
| 13 | C | $Cu(O_2C_2H_3)_2 \cdot H_2O$ (9% Cu) | 300, $N_2$ | 81 |
| 14 | D | $Cu(O_2C_2H_3)_2 \cdot H_2O$ (9% Cu) | 300, $N_2$ | 100 |
| 15 | D | $CuC_2O_4 \cdot 0.5H_2O$ | 300, $N_2$ | 30 |
| 16 | none | $Cu(O_2C_2H_3)_2 \cdot H_2O$ | 350, $N_2$ | 24 |
| 17 | A | $FeC_2O_4 \cdot 2H_2O$ (9% Fe) 100° C | 400, $N_2$ | 37 |
| 18 | A | $FeC_2O_4 \cdot 2H_2O$ (9% Fe) | 500, $N_2$ | 71 |
| 19 | A | $FeC_2O_4 \cdot 2H_2O$ (9% Fe) | 600, $N_2$ | 74 |

TABLE 4-continued

| Example | Substrate | Metal Containing Thermolysis Precursor | Furnace Treatment Temperature (° C.) | Chloramine Reduction (%) at 180 sec |
|---|---|---|---|---|
| 20 | none | $FeC_2O_4 \cdot 2H_2O$ | 400, $N_2$ | 48* |
| 21 | none | $FeC_2O_4 \cdot 2H_2O$ | 240, air | 0+ |

*Denotes samples, where 1.5 cc of carbon substrate sample was used, instead of the 0.46 g in the Chloramine Removal Test.
+Denotes a sample, where 2.5 g of carbon substrate sample was used, instead of the 0.46 g in the Chloramine Removal Test Metal Leaching and Aging Experiments 1.0 g of Examples 1, 4, and 17 were each exposed to 150 mL of a 3 ppm chloramine solution for 4 days. In a similar experiment, 0.50 g of Example 5 was exposed to 20 mL of water for 2 days. The respective solutions were filtered through a 0.45 µm polypropylene syringe filter (obtained from VWR International, LLC, Radnor, Pa.) and analyzed by ICP-OES (Model Perkin Elmer Optima 3300VP obtained from Perkin Elmer, Inc. Waltham, Mass.) for iron or copper concentration. Also, each sample after aging was dried in air and tested for chloramine removal by the method described above. Metal concentrations after aging studies and the chloramine removal percentage after a 3 minute reaction time are tabulated in Table 5. Example 4 was not analyzed for chloramine removal. Higher furnace treatment temperatures or other surface modification may be necessary to have an insoluble copper containing material supported on an alumina surface such as described herein.

TABLE 5

| Example | Metal Analyzed and Concentration (ppm) | Chloramine Removal (%) at 3 min |
|---|---|---|
| 1 | Cu, 0.09 | 52 |
| 4 | Cu, 33.3 | NA |
| 5 | Cu, 0.047 | 60 |
| 17 | Fe, <0.1 | 50 |

Analysis of Materials by p-XRD

Some of the examples described herein were analyzed by p-XRD (Philips vertical diffractometer with copper $K_\alpha$ radiation-another case), to determine potentially active metal oxide phases involved in the chloramine removal reaction. and the results are tabulated in Table 6

TABLE 6

| Example | Metal or Metal Oxide (containing copper or iron) Phases Identified |
|---|---|
| 2 | Cu |
| 4 | Cu |
| 8 | Cu |
| 15 | Cu |
| 21 | $Fe_2O_3$ |
| 20 | $Fe_3O_4$ (magnetite) |

Table 6 shows that the thermolysis of $CuC_2O_4 \cdot 0.5H_2O$ in Examples 2 and 4 and $Cu(O_2C_2H_3)_2 \cdot H_2O$ in Example 8, produced a material by x-ray analysis which is consistent with copper metal. However, Examples 2, 4, and 8 showed a greater activity for the removal of chloramines than the commercially available finely divided copper metal. See Table 3. Thermolysis of $FeC_2O_4 \cdot 2H_2O$, produced a material by x-ray analysis which is consistent with $Fe_3O_4$ in Example 16, yet Example 16 showed a greater activity for the removal of chloramines than the commercially available $Fe_3O_4$ The same is also true for Example 20. These data appear to indicate that the thermal decomposition is uniquely changing the composition, enabling the decomposition product to be more effective at the removal of chloramines.

Surface Area Analysis of Comparative Example B and Examples 5 and 20

Comparative Example B and Examples 5 and 20 were analyzed and found to have the following BET surface areas shown in Table 7. It is worth noting that although Examples 5 and 20 do not have high surface areas, they still exhibit adequate chloramine removal rates, similar to substrates with very high BET surface areas, such as in comparative example A.

TABLE 7

| Sample | BET Surface Area, $m^2g^{-1}$ |
|---|---|
| Comp. B | 1637 |
| 5 | 2.5 |
| 20 | 13.5 |

Foreseeable modifications and alterations of this invention will be apparent to those skilled in the art without departing from the scope and spirit of this invention. This invention should not be restricted to the embodiments that are set forth in this application for illustrative purposes. To the extent that there is a conflict or discrepancy between this specification and the disclosure in any document incorporated by reference herein, this specification will control.

What is claimed is:

1. A method for removing chloramine from aqueous solutions comprising:
   providing an aqueous solution comprising chloramine and contacting the aqueous solution with a composition comprising a metal-containing particulate, wherein the metal-containing particulate comprises a thermolysis product of a metal carboxylate.

2. The method for removing chloramine from aqueous solutions of claim 1, wherein the thermolysis product of a metal carboxylate when washed does not lose more than 40% activity for the removal of chloramines.

3. The method of claim 1, wherein after contacting the aqueous solution with a composition comprising a metal-containing particulate, the resulting aqueous solution comprises a reduced amount of chloramine.

4. The method of claim 1, wherein the carboxylate of the metal carboxylate comprises an oxalate, an acetate, a citrate, and combinations thereof.

5. The method of claim 1, wherein the metal of the metal carboxylate is selected from the group consisting of copper, iron, manganese, and combinations thereof.

6. The method of claim 1, wherein the metal-containing particulate is substantially free of sulfur atoms.

7. A method for removing chloramine from aqueous solutions comprising:
   heating a metal carboxylate to form a thermolysis product;
   cooling the thermolysis product; and
   contacting the cooled thermolysis product with an aqueous solution comprising chloramine.

8. The method of claim 7, wherein the heating is conducted at a temperature of 300° C.

9. The method of claim 7, wherein at least a portion of the metal carboxylate is disposed on a support during the heating step.

10. The method of claim 7, wherein the heating is conducted in an inert atmosphere.

* * * * *